INVENTOR.
PHILIP O. VAN LOOKEREN
BY
Frank R. Trifari
AGENT

INVENTOR.
PHILIP O. VAN LOOKEREN
BY
Frank R. Trifari
AGENT

3,534,168
GAMMA-CORRECTION CIRCUIT

Philip Otto van Lookeren, Emmasingel, Netherlands, assignor, by mesne assignments, to U.S. Philips Corporation, New York, N.Y., a corporation of Delaware Filed July 13, 1967, Ser. No. 653,134
Claims priority, application Netherlands, July 16, 1966, 6610059
Int. Cl. H04n 5/20
U.S. Cl. 178—7.1 8 Claims

ABSTRACT OF THE DISCLOSURE

A gamma-correction circuit where the slopes of the different parts of the curve can be individually adjusted without influencing each other, while the black and the white level remain at constant values. The circuit arrangement has three transistors directly interconnected at their collectors, the corrected signal being produced as a superimposition voltage via this connection through a common impedance. The second and the third transistors are each provided with an adjustable resistor which determines their amplification without disturbing the black and white clamp levels.

The invention relates to a gamma-correction arrangement having a correction characteristic for matching of the brightness-voltage characteristic of a television camera tube to the voltage-brightness characteristic of a display tube. The correction characteristic consists through the signal range of curves of different slopes lying between the values fixed by clamp circuits which correspond to the black and the white level, respectively, applied to the signal of the camera tube. The arrangement comprises current sources which are controlled by the signal to be corrected, that is a first current source which produces a current varying throughout the signal range of the correction characteristic, a second current source which produces a current varying through a first part of the signal range from a value fixed at the black level by a clamp circuit to a second fixed value, and a third current source which produces a current varying through a second part of the signal range from a third fixed value to a value fixed at the white level by a clamp circuit. The first and the second part of the signal range of the correction characteristic do not overlap each other and the currents in the first part and in the second part vary in opposite senses.

It is known inter alia from German Pat. 1,216,922 to use such gamma-correction arrangements for obtaining a variable amplification factor through the signal range between the black and the white level of a camera tube. This can be achieved in a simple manner when the correction characteristic consists of parts having different slopes. In general, the requirement is then imposed that variation of the amplification factors in the characteristic, i.e., the shift of the bending points between parts of different slopes and variation of the inclinations, should not result in a simultaneous variation of the black and white level, but that these levels should remain at fixed values independently of said variations. These values can be fixed by means of clamp circuits.

The operation of the known gamma-correction arrangement can be explained in the simplest manner with the aid of the input signal linearly varying with time through the signal range. The output signal then corresponds with the correction characteristic. It has been found that a correction characteristic can be obtained by means of three current sources. The first current source such as a triode, produces under the control of the signal to be corrected varying linearly with time through a resistor included in the anode circuit a voltage more or less linearly decreasing throughout the signal range between the black and the white level.

A common resistor is included in the anode circuits of the second and the third current sources which can be also triodes. The said current produced through a first or a second part of the signal range produce a superimposition voltage through this resistor. This voltage is superimposed through a control circuit including a triode with a variable amplification factor adjustable by means of a potentiometer on the voltage produced through the resistor in the anode circuit of the first current source.

The correction arrangement described has the advantage that a given gamma can be adjusted by means of a potentiometer. However, it is disadvantageous in that firstly a triode having a special characteristic must be used to obtain a variable amplification factor and that secondly the inclinations of the correction characteristic in the proximity of the black- and the white level cannot be adjusted independently of each other, but only in combination, that is to say through the control circuit.

The gamma-correction arrangement according to the invention has for an object to provide a variable correction characteristic the various inclinations of which can be individually adjusted without influencing each other, while the black and the white level remain at constant values. The arrangement according to the invention is characterized in that the three current sources are directly interconnected at one end, the corrected signal being produced as a superimposition voltage via this connection through a common impedance, and in that the second and the third current sources are each provided with an adjustable resistor which determines the extent of the current variation and which does not conduct current at the level fixed by the relevant clamp circuit.

The invention is based on recognition of the fact that, when the second and the third current sources with their associated clamp circuits are connected so that resistors determining the slope in the proximity of the black and the white level, respectively, does not conduct at these levels. The slope in the proximity of the black and the white levels, respectively can be varied without influencing the respective levels.

The arrangement according to the invention moreover has the advantages that the calibration process for adjusting the correct signal range between the black and the white level can be carried out readily and that the white level may be varied in a simple manner.

The arrangement in accordance with the invention will be described more fully, by way of example, with reference to the following figures, of which:

Figure 1:
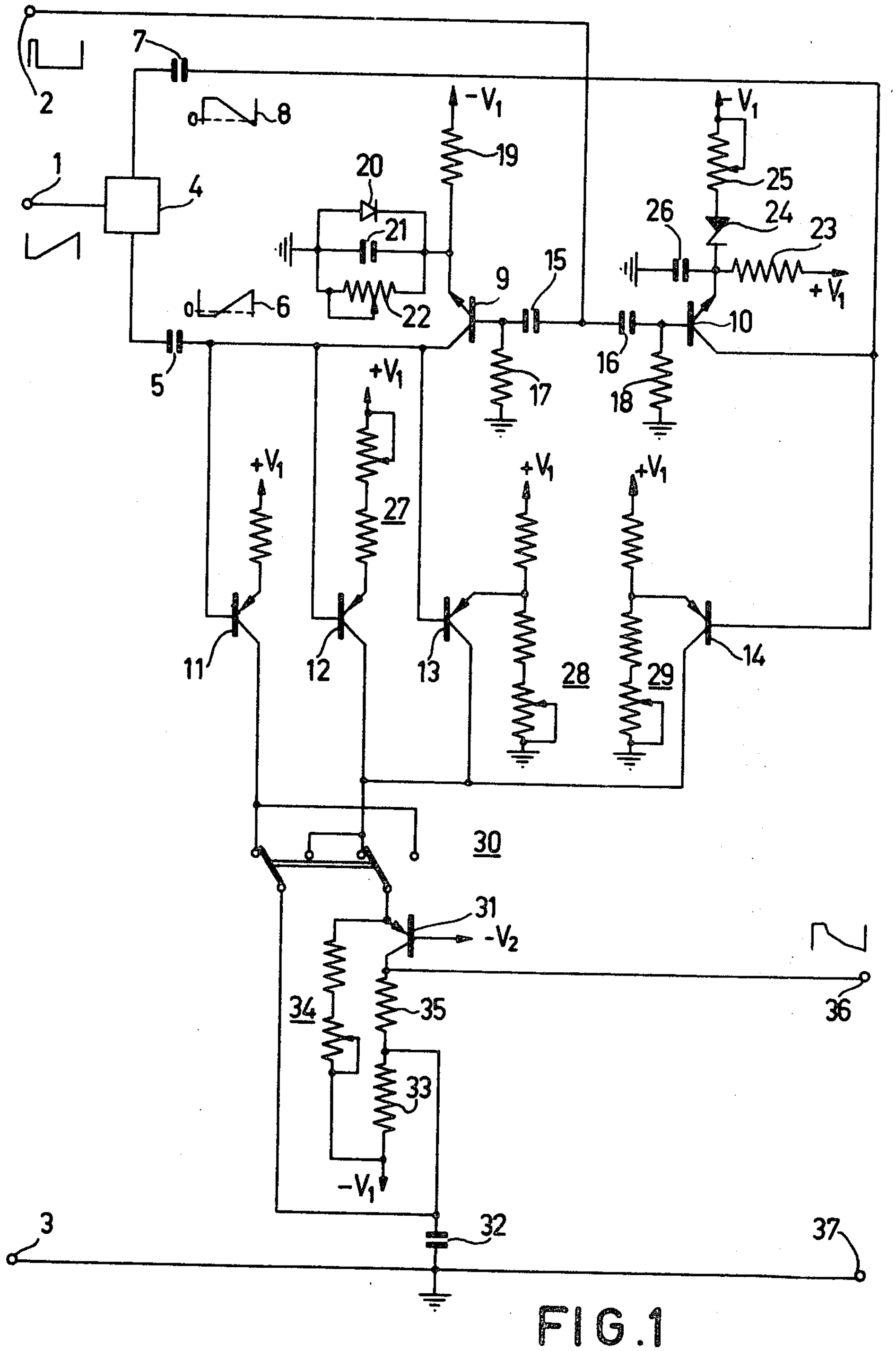
FIG. 1 shows an embodiment of the invention.

In FIG. 1, the signals shown at input terminals 1 and 2 are applied to said terminals with respect to a ground terminal 3. The signal shown for one period at input terminal 1 is composed of a first part of constant value and a part varying linearly with time. For the television camera tube (not shown) for example, a "Plumbicon," this signal represents the black level and the gray varying linearly to the white level, respectively. The operation of the gamma-correction arrangement according to the invention may be illustrated in a simple manner with the aid of this signal, which represents for one line period of the television signal all the values lying between the black and the white level. A phase inverter stage 4 connected to input terminal 1 supplies through a capacitor 5 a voltage 6, and through a capacitor 7 a voltage 8, so that no direct-voltage component is transferred therewith. The voltages 6 and 8 are supplied to the collector of transistors 9 and 10, respectively, and to the bases of transistors 11, 12, 13 and transistor 14, respectively. The clamp pulses applied to input terminal 2, which are synchronized with the line scanning in the television camera tube, are coupled through capacitors 15 and 16, respectively, to the bases of transistors 9 and 10 respectively. The bases are connected to ground through leakage resistors 17 and 18. Transistors 9 and 10 form part of clamp circuits by means of which a suitable direct voltage component is reintroduced into the voltages 6 and 8. The level of the ground potential thus obtained in the voltages 6 and 8 is shown diagrammatically by the dotted line 0. In order to fix the direct voltage component, the emitter of transistor 9 is connected through a resistor 19 to a terminal to which a negative voltage $-V_1$ is applied. This emitter is also connected to ground through the parallel-combination of a diode 20, a decoupling capacitor 21 and a variable resistor 22. For the same purpose, the emitter of transistor 10 is connected through a resistor 23 to a terminal to which a positive voltage $+V_1$ is applied and through a Zener diode 24 connected in series with a variable resistor 25 to the terminal to which the negative voltage $-V_1$ is applied. A capacitor 26 serves as a decoupling capacitor with respect to ground. The diode 20 and the Zener diode 24 respectively, in the clamp circuit serve to eliminate temperature influence on the voltage drop across the emitter-base junction of transistors 13 and 14, respectively. Thus, the direct voltage component introduced by the clamp circuit is independent of temperature influences. The emitters of transistors 11, 12, 13 and 14 are connected through resistors to the terminal $+V_1$ at positive potential, resistor 27 included in the emitter circuit of transistor 12 being variable. Moreover, the emitters of transistors 13 and 14 are connected to ground through variable resistors 28 and 29.

In the position shown in FIG. 1 (referred to hereinafter as the gamma position) of a switch 30, the interconnected collectors of transistors 12, 13 and 14 are connected to the emitter of a transistor 31, while the collector of transistor 11 is connected through a decoupling capacitor 32 to ground and through a resistor 33 to the terminal $-V_1$ at negative potential. In the other position (referred to hereinafter as the linear position) of the switch 30, the through connections are interchanged. The emitter of transistor 31 is connected through a variable resistor 34 to the terminal $-V_1$ at negative potential. Under the influence of the current applied to the emitter of transistor 31, a voltage is produced across a resistor 35 included in the collector circuit of transistor 31, which voltage may be derived from the output terminals 36 and 37.

In the linear position of switch 30, the input signal, supplied in limited form, is given off by transistor 11 via transistor 31 and resistor 35 to the output terminals 36 and 37 without being varied. At the same time, the collectors of transistors 12, 13 and 14 are directly connected to ground through the decoupling capacitor 32 so that these transistors do not influence the output signal.

In the gamma position of switch 30 on the contrary, transistor 11 does not influence the gamma-corrected output signal. The use of switch 30 provides the possibility of comparing the signal range between black and white level of the unvaried signal with the signal range of the gamma-corrected signal so that a simple calibration is obtained. It will appear that the calibration can be carried out by means of variable resistor 27.

The operation of the arrangement according to the invention will be explained with reference to FIG. 2. Switch 30 in FIG. 1 is in the gamma position.

Figure 2:
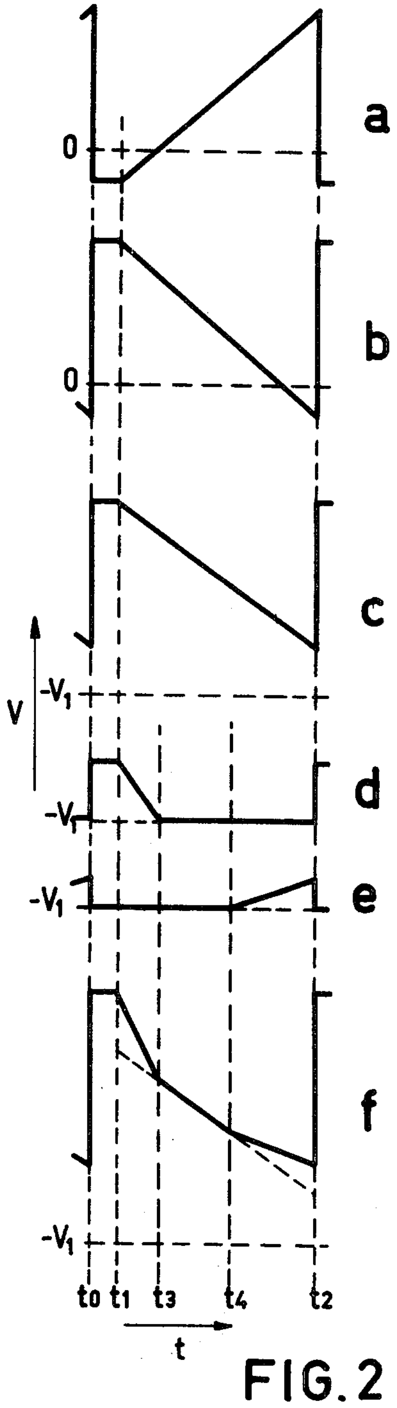
FIGS. 2 and 3 are waveform diagrams which serve to illustrate the operation of the arrangement of FIG. 1.

In the graphs of FIG. 2, the time axis $t$ is plotted on the abscissa and the potential V on the ordinate. The voltages 6 and 8 shown in FIG. 1 are illustrated again in FIGS. 2*a* and 2*b*. In FIGS. 2*a* and 2*b*, the part of constant potential in the time interval $t_0-t_1$ represents the black level, and the maximum (FIG. 2*a*) and the minimum (FIG. 2*b*) potential, respectively, at the instant $t_2$ represents the white level. It should be noted that the potential at the instant $t_2$ in fact corresponds to the potentials at the instant $t_0$ of the preceding line period. The time interval $t_0-t_2$ is equal to the line period of the signals supplied by the television camera tube. The television signal supplied to the input terminal 1 has a given amplitude between the black and the white level. A direct voltage component is introduced into the voltages 6 and 8 by means of transistors 9 and 10. For during the clamp pulse, transistors 9 and 10 will be conducting, so that the collectors substantially assume the respective emitter potentials. By means of resistor 22, the emitter potential of transistor 9 is adjusted to such a negative value that during clamping at the black level, the emitter potential of transistor 13 is equal to ground potential. When the voltage drop across the emitter-base junction of transistor 13 is taken into account, the potential superimposed on the base must have a small negative value. This is shown in FIG. 2*a* for the time interval $t_0-t_1$. Due to the negative constant potential superimposed on the bases, the transistors 11, 12 and 13 will cause constant currents to flow through the respective collector circuits for the time interval $t_0-t_1$. After the instant $t_1$, the collector currents will decrease due to the increasing base potential.

The emitter potential of transistor 10 is adjusted by means of resistor 25 to such a positive value that at the potential shown in FIG. 2*b* at the instant $t_2$ (white level), the emitter potential of transistor 14 is equal to ground potential. Therefore, it is required that, with regard to the voltage drop across the base-emitter junction, the base potential of transistor 14 has a small negative value at the instant $t_2$. This is achieved by utilizing the fact that the amplitude supplied between the black and the white level in the signal 8 is limited (that is to say that the peak-to-peak value of the signal 8 is to be considered substantially constant); the signal 8 is fixed for the time interval $t_0-t_1$ at a positive potential. The positive potential which is then supplied to the base of transistor 14 by the clamp circuit for the time interval $t_0-t_1$ and which exceeds the emitter potential, cuts off transistor 14. After the instant $t_1$, the base potential of transistor 14 (FIG. 2*b*) decreases. When the base potential falls below the emitter potential adjusted by means of resistor 29, transistor 14 becomes conducting. At the instant $t_2$, the emitter potential of transistor 14 is adjusted by resistor 25 so as to be equal to ground potential. The process is repeated for a next period of signal 8.

The superimposition principle will be applied below for illustrating the operation of the circuit according to the invention. If none of the transistors of the circuit supplies current, the output terminal 36 is at the potential $-V_1$. Therefore, reference will be made to this potential $-V_1$ in the figures still to be described.

FIG. 2*c* represents the potential applied to output terminal 36 if only transistor 12 supplies current in the gamma position of switch 30. Transistor 31 may be left out of consideration, since this transistor only serves as a transfer element. Transistor 12 supplies current throughout the period $t_0-t_2$ of the signal 6 applied to the base. This appears from FIG. 2*c* by the location of the signal shown with respect to the reference potential $-V_1$. The collector current then decreases from a maximum value associated with the black level to a minimum value associated with the white level. The amplitude of the signal between the black and the white level (FIG. 2*c*) can be adjusted by means of resistor 27.

FIG. 2*d* shows the signal produced at the output terminal 36 if only transistor 13 conducts current. The current flowing through transistor 13 at the black level ensures, under the influence of the clamp circuit comprising transistor 9 and variable resistor 22, that the emitter of transistor 13 is applied to ground potential. According to this step of the invention, the current value at the black level is thus independent of the value of resistor 28, while the time interval $t_0$–$t_3$ of FIG. 2*d* is adjusted by resistor 28. The instant at which the signal 6, which is applied as a blocking voltage to the base of transistor 13, cuts off this transistor 13 depends upon the emitter potential adjustable by means of resistor 28.

FIG. 2*e* represents the potential applied to the output terminal 36 if only transistor 14 supplies the current which flows through resistor 35. The potential at the base of transistor 14, which is brought to a positive potential by the clamp circuit comprising transistor 10 and variable resistor 25 in the time interval $t_0$–$t_1$, ensures that the transistor 14 remains cut off. However, signal 8 is applied as a turn on voltage to the base. By means of resistor 29, the emitter of the cut-off transistor 14 is applied to a given potential. If the value of the base potential of the signal 8 falls below that of the emitter potential, transistor 14 becomes conducting. The output terminal 36 then has a potential variation as shown in FIG. 2*e*. As has been stated above, the resistor 25 will be adjusted so that at the instant $t_2$ the emitter potential of transistor 14 will be equal to ground potential. According to these further steps of the invention, the current value at the white level is independent of the value of resistor 29, while the time interval $t_4$–$t_2$ of FIG. 2*e* is adjusted by means of this resistor 29.

FIG. 2*f* represents the potential applied to the output terminal 36 if in the gamma position of switch 30, the three transistors 12, 13 and 14 together produce a superimposition voltage across resistor 35 under the influence of the signal shown at the input terminal 1. Starting from the instant $t_1$, FIG. 2*f* corresponds with the correction characteristic of the gamma-correction arrangement if the linearly increasing input signal is plotted on the time axis *t*. The instants $t_1$ and $t_2$ respectively, represent the signal associated with the black and the white levels, respectively, of the camera tube.

The simple and independent adjustability of the slopes in the correction characteristic will become clearly manifest in the description of the variable resistors to be adjusted.

Variable resistors 22 and 25, respectively, are adjusted in the clamp circuit comprising transistor 9 and 10, respectively, so that for a signal supplied to the base of transistors 13 and 14, respectively, at the black and the white level, respectively, the emitter of transistors 13 and 14, respectively, are at ground potential. This is achieved by supplying, in the time interval $t_0$–$t_1$ of each period of the television signal by means of the relevant clamp circuit, the required charge to the capacitors 5 and 7, respectively, so that a direct voltage component is produced across them. Clamping at the black level under the control of the clamp pulses is possible due to the fact that the black level occurs in each period of the television signal, i.e., during the fly-back time in the line scanning in the television camera tube. The white level may be fixed with respect to the black level for the supply of the television signal lying within a limited range (between black and white level) to the correction arrangement. Thus, even in the absence of the white level in a period of the television signal, the correct direct voltage component will be produced across capacitor 7.

Variable resistor 27 serves to carry out the calibration. The switch 30 provides the possibility of comparing the signal range between black and white level of the unvaried signal supplied through transistor 11 with that of the gamma-corrected signal supplied through transistors 12, 13 and 14. In case any difference occurs, the two signal ranges can be made equal to each other by means of variable resistor 27.

From the black level, the bending point and the inclination in the correction characteristic may be adjusted by means of variable resistor 28. For illustration, FIG. 2*d* is compared with FIG. 3*d*, while FIGS. 2*a*, *b*, *c* correspond with FIGS. 3*a*, *b* and *c*, respectively. The time interval $t_0$–$t_3$ in FIG. 2*d* is shorter than the time interval $t_0$–$t_5$ in FIG. 3*d*. When the voltage 6 increasing linearly with time is taken into account, it follows that the transistor 13 is cut off in the case of FIG. 2*d* at a lower base potential than in the case of FIG. 3*d*. If it is assumed that transistor 13 is cut off when the potentials of base and emitter are substantially equal, it is found that in the case of FIG. 2*d* resistor 28 has a lower value than in the case of FIG. 3*d*. An increase of resistor 28 will result in a shift of the bending point in the proximity of the black level (at the instant $t_3$) farther towards the white level in the correction characteristic (at the instant $t_5$), while the slope then also decreases.

Figure 3:
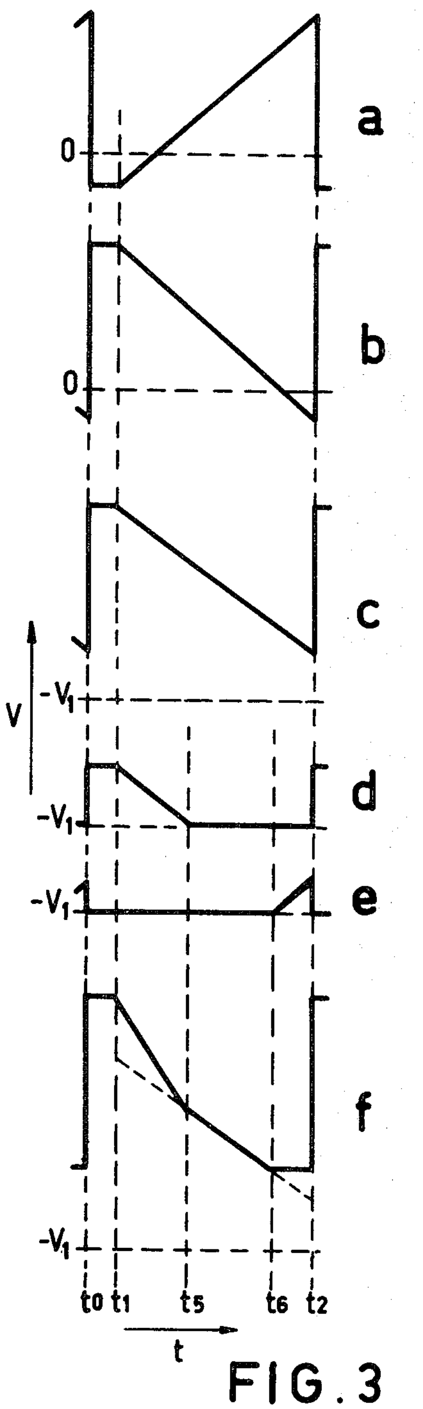

The variable resistor 29 serves to shift the bending point (from instant $t_4$ to instant $t_6$) and to vary the inclination in the proximity of the white level of the correction characteristic. In accordance with the adjusted value of the variable resistor 29, transistor 14 will become conducting when the base potential falls below the emitter potential. It is found that at a low value of resistor 29, transistor 14 will become conducting only at low values of the base potential. When comparing FIG. 2*e* with FIG. 3*e*, it is found that the value of resistor 29 in the case of FIG. 3*e* is lower than in the case of FIG. 2*e*. FIGS. 3*e* and 3*f* show the case in which resistor 29 reaches its minimum value. Lower values are not allowed, since otherwise, as appears from FIG. 3*f*, the correction characteristic does not remain within the signal range between black and white level fixed by the clamp circuits.

A peak white limiter has been provided and is adjustable by means of variable resistor 34. Although the input signal lies in a range between the black and the white level, this signal may as yet have parts exceeding the white level due to local points of great brightness in the image to be picked up by the television camera tube. Resistor 34 prevents the undesirable appearance of these signal parts at the output terminal 36. Owing to the current distribution over transistor 31 and resistor 34, at a small current, the small voltage drop across resistor 34 causes the value of the emitter potential of transistor 31 to become more negative than that of the base potential so that transistor 31 is cut off. The value of the current when this transistor is cut off or the peak white limiting level can be adjusted by means of resistor 34.

It will be appreciated that the principle according to the invention can be also applied when using current sources other than transistors. Current sources comprising several component parts or tubes may also be used in arrangements according to the invention.

It will also be evident that, if more than two bending points in the correction characteristic should be obtained, a proportionally larger number of current sources operating through part of the signal range are required. Bending points lying in parts overlapping each other are mutually influenced, however.

Moreover, it will be appreciated that the principle of the invention also applies to the combination of a current increasing throughout the signal range with a current increasing to a second fixed value and a current decreasing from a third fixed value through part of the signal range in the proximity of the black and the white level, respectively. The clamp circuits for fixing the black and the white level should be adjusted so that at the respective levels, the emitter resistor determining the slope of the current is idle.

What is claimed is:

1. A gamma-correction circuit comprising a source of television video signal having an amplitude range defined by black and white levels, means connected to said source for producing a first current that varies as a function of the amplitude of said video signals throughout the range of said signals, means connected to said source for producing a second current that varies in one sense as a function of the amplitude of said signals from a predetermined amplitude corresponding to the black level of said signals to substantially zero at a first level of said signals between said black and white levels, means connected to said source for producing a third current that varies in the opposite sense as a function of the amplitude of said signals from substantially zero at a second level of said signals between said first and white levels to a predetermined amplitude corresponding to the white level of said signals, said first level being closer to the black level than said second level, and means for adding said first, second and third currents to produce a gamma-corrected signal.

2. A gamma-correction arrangement as claimed in claim 1 wherein each of said producing means comprises a transistor having emitter, base and collector electrodes, and a common collector impedance coupled to said collectors.

3. A gamma-correction arrangement as claimed in claim 1 further comprising first and second fixed impedances respectively coupled to the emitters of the second and the third transistors, and to a direct voltage terminal.

4. The circuit of claim 1 comprising a source of clamping pulses occurring during the line flyback time of said video signals, means for clamping the signals applied to said means for producing first and second currents to a first level coresponding to the black level by means of said clamping pulses, and means for clamping the signals applied to said means for producing said third current to a second level corresponding to the white level by means of said clamping pulses.

5. The circuit of claim 4 comprising means for inverting the signals applied to said means for producing said third current with respect to the signals applied to said means for producing said first and second currents.

6. A gamma-correction arrangement as claimed in claim 4 wherein each of said means for clamping comprises a transistor having emitter, base and collector electrodes, the collectors receiving the signals to be clamped, the base receiving the clamp pulses, a diode being included for temperature stabilization in each of the emitter circuits.

7. A gamma-correction arrangement as claimed in claim 1 further comprising a fourth means for producing current which amplifies the signal to be corrected in the non-corrected state and a selection switch through which the said three producing means or the fourth producing means are alternatively coupled to said adding means.

8. A gamma-correction arrangement as claimed in claim 7, wherein said adding means comprises a transistor having emitter, base and collector electrodes, the selection switch being connected to the emitter of the transistor a variable resistor coupled to a terminal at a constant direct voltage and to the emitter so that a peak white limiting level of the signal to be corrected is adjusted.

References Cited

UNITED STATES PATENTS 3,341,654 9/1967 Pay et al.

FOREIGN PATENTS 732,867 6/1955 Great Britain.

ROBERT L. GRIFFIN, Primary Examiner

R. L. RICHARDSON, Assistant Examiner

U.S. Cl. X.R.

178—7.3